Mar. 6, 1923.
J. M. MEREDITH
1,447,804
COLLAPSIBLE TIRE RIM
Filed Nov. 17, 1920
2 sheets-sheet 1
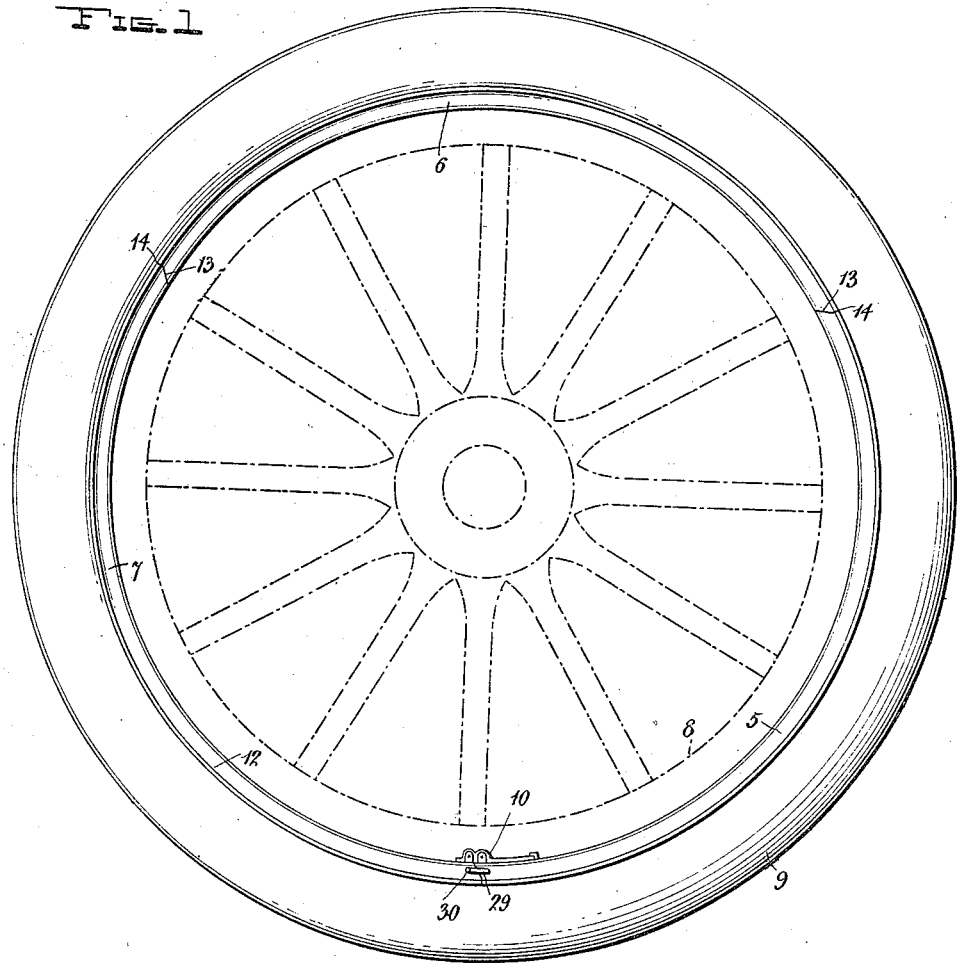
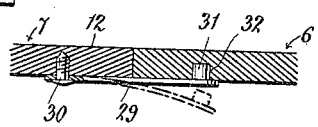
Inventor
Jaquelin M. Meredith,
By
Attorney Mar. 6, 1923.
J. M. MEREDITH
1,447,804
COLLAPSIBLE TIRE RIM
Filed Nov. 17, 1920
2 sheets-sheet 2
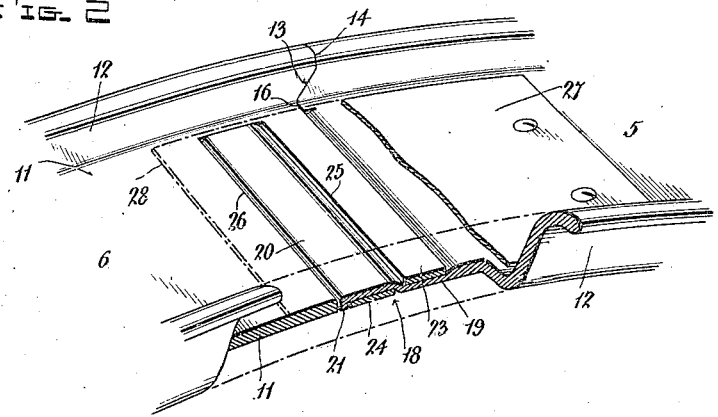
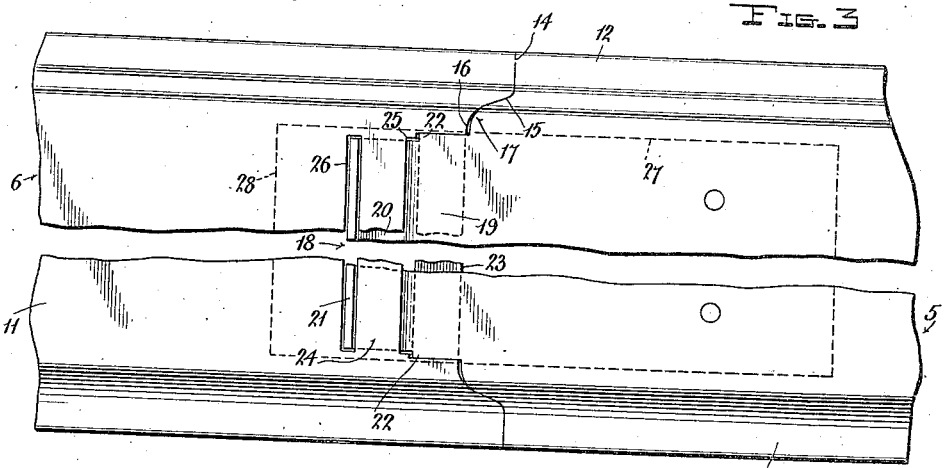
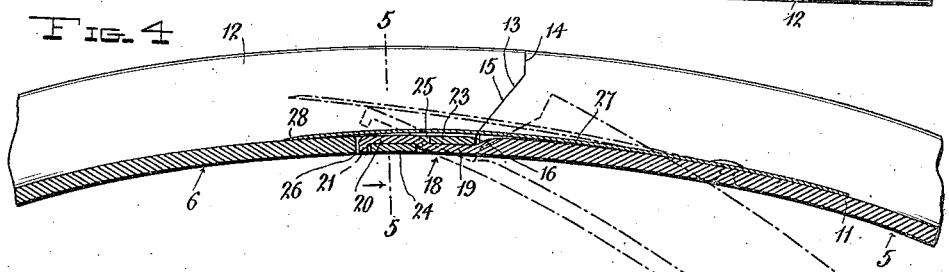
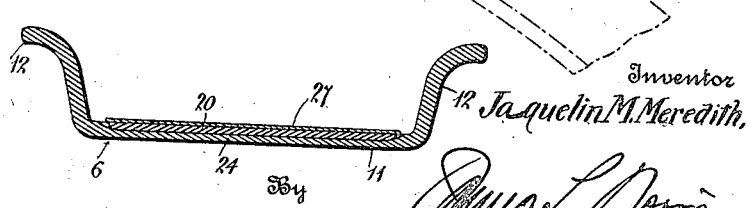
Inventor
Jaquelin M. Meredith,
By Patented Mar. 6, 1923.

1,447,804

UNITED STATES PATENT OFFICE.

JAQUELIN M. MEREDITH, OF NORFOLK, VIRGINIA.

COLLAPSIBLE TIRE RIM.

Application filed November 17, 1920. Serial No. 424,746.

*To all whom it may concern:*

Be it known that I, JAQUELIN M. MEREDITH, a citizen of the United States, residing at Norfolk, in the county of Norfolk and State of Virginia, have invented new and useful Improvements in Collapsible Tire Rims, of which the following is a specification.

This invention relates to improvements in collapsible tire rims, and particularly to a lock joint for effectively locking the ends of a cross cut demountable rim. The primary object of the invention is to provide a comparatively simple means whereby the rim may be formed in separable sections which interlock with each other through the provision of means forming joints flush with the opposing inner and outer surfaces of the rim and permitting the meeting ends of the sections to be swung inwardly after the rim has been detached from the felly of the vehicle wheel. A further object of the invention is to provide a locking joint between the meeting ends of the sections of a collapsible demountable rim for a tire and secure the said ends against circumferential separation or radial displacement when the rim is in use, and to produce a practically smooth surface at the location of the end joints when the sections are locked and in distended positions, the sections being particularly held against displacement relatively to one another in an edgewise direction. A further object of the invention is to provide a novel form of locking joint for sections of a collapsible demountable rim that will be maintained against separation, though free for movement when the rim is demounted during ordinary usage in connection with a wheel felly, but permitting the several sections to be easily separated for compact arrangement for transportation, shipping or storage purposes. A still further object of the invention is to generally improve and efficiently construct the joints for the meeting ends of the sections of collapsible demountable rims of that type which are preferably provided with means in connection with the meeting ends of two of the sections for releasing the latter section ends to permit a collapse of the several sections and also for causing the sections to distend and locking the same in normal tire holding positions.

With these and other objects and advantages in view, the invention consists in the construction and arrangement of the several parts which will be more fully hereinafter described and claimed.

In the drawings:

Fig. 1 is a side elevation of a wheel rim and wheel in dotted lines embodying the features of the invention.

Fig. 2 is a sectional perspective view of a portion of sections of a demountable rim, showing the improved lock joint.

Fig. 3 is a plan view looking towards the inner side of the rim and partially broken through and illustrating the improved lock joint.

Fig. 4 is a longitudinal vertical section of portions of the extremities of sections of the rim showing the parts of the improved joint at the meeting ends thereof.

Fig. 5 is a transverse vertical section taken in the plane of the line 5—5, Fig. 4.

Fig. 6 is a detail horizontal section, showing a locking means for the meeting ends of the rim sections and applied to and operating with the flanges of the latter.

The numerals 5, 6 and 7 designate the segments of a collapsible rim adapted to be applied to the felly 8 of a wheel and constructed in accordance with the features of the invention to facilitate the application and removal of a tire 9. The segments 5, 6 and 7 are locked in distended positions and started in their collapsing movement when it is desired to remove the tire 9 from the rim 5 by a lever organization 10, which is in all respects similar to the construction and arrangement of parts disclosed by my pending application, Ser. No. 365,927, allowed May 28, 1920. This lever mechanism forms no part of the present invention and may have the later improved construction disclosed by my pending application, Ser. No. 377,520, filed April 29, 1920, substituted therefor, or any other preferred form of lever organization may be used, in view of the fact that this lever organization does not embody the features of the present invention. The present invention relates to a hinge joint or connection between the meeting ends of the sections 6 and 5 and 7, said hinge joint being shown on an enlarged scale by Figs. 2, 3, 4 and 5. The rim as a whole is channeled, as in the construction ordinarily adopted in devices of this type, the said channeled rim comprising as its essential components a flat metal body 11 with outwardly flaring side flanges 12. At the location of the hinge joints constituting the improvements in the present instance, the flanges are cut through, preferably in the manner clearly shown by Fig. 4, first, diagonally or at an inclination, as at 13, and then straight through in a radial direction, as at 14, thereby producing a retention offset or shoulder construction, as at 15, which will operate to facilitate the assemblage of the meeting terminals or ends of the sections, and particularly the flanges 12, and serve to positively retain the cut portions of the flanges or meeting ends thereof in positive alined association when the rim sections are disposed in normal tire holding positions, or distended, as shown by Fig. 1. The body 11 of the meeting end of one section is cut to form a recess 16, as shown by Fig. 3, and the meeting end of the adjacent section is projected, as at 17, to snugly enter the said recess, this particular formation of the meeting ends of the sections also preventing any tendency to lateral or edgewise shifting movement of the meeting ends when assembled, and also facilitating accurate registration of the said meeting ends. From the one meeting end of the rim section 5 a locking tongue 18 centrally extends from the center of the projection 17, the said tongue 18 being reduced in thickness and formed with a slight depression 19, which regularly merges into a catch extremity 20 struck upwardly in a reverse direction and terminating in an inwardly projected rib 21 extending fully thereacross. Between the depression or depressed member 19 of this tongue and the catch extremity 20 limiting shoulders 22 are formed by slightly reducing the width of the said catch extremity relatively to the remaining portion of the tongue. The adjacent meeting end of the section 6 is reduced in thickness and formed with cross bars 23 and 24, the cross bar 24 being in length slightly greater than the width of the catch extremity 20 of the tongue 18. The cross bar 24 is struck downwardly or depressed, the two bars 23 and 24 being separated by an intervening slot 25, and between the cross bar 24 and the adjacent thicker body 11 of the section 6 a slot 26 is formed to receive the catch rib 21 on the end of the catch extremity 20. The combined thickness of the tongue 18 and the cross bars 23 and 24 is just equal to the thickness of the body 11 of each section, so that when the tongue 18 and the cross bars 23 and 24 are assembled there will be no projection of any part of either of the said devices above or below the outer and inner surfaces of the said section bodies 11, as clearly illustrated by Figs. 2 and 4.

The improved hinge joint also includes a combined spring keeper and guard or cover strip 27 firmly secured on the body 11 of one section and free to loosely extend across the hinge joint and engage a portion of the body 11 of the adjacent section, as, for instance, the sections 5 and 6. This combined keeper and cover strip is of thin metal and of a width sufficient to completely cover the joint, as clearly shown by Fig. 5. At its free end 28 the combined keeper and cover strip 27 is reduced in thickness so as to form a close joint or assemblage with the part of the body 11 of the one section on which it bears, as shown by Fig. 4, in order to reduce as much as possible any shoulder formations.

At the location of the lever organization 10 an auxiliary locking means is applied to the ends of the sections 5 and 7 to prevent any possibility of a lateral shifting movement or displacement of the said ends, this means consisting of a spring strip 29 secured to the end of the section 7 by a screw or other fastening 30, the strip being long enough to extend across the joint and having at its free end a stud 31 which is adapted to engage a socket 32 formed in the adjacent part of the end of the section 5. It is obvious that when the stud 31 is in engagement with the socket 32, the meeting ends of the sections 5 and 7 will be prevented from becoming accidentally displaced, and when it is desired to separate these meeting ends the free extremity of the spring strip 29 is pulled outwardly to disengage the stud 31 from the socket 32.

The operation of the hinge joint is very simple, and in assembling the tongue 18 with the bars 23 and 24, the meeting ends of the sections are disposed at an outward relative inclination so as to permit the catch member 20 of the tongue to be inserted through the slot 25 from the under side of the bar 23 and pushed over the upper side of the bar 24 until the limiting shoulders 22 strike the adjacent edge of the said bar 24, and by straightening the meeting ends of the sections the rib 21 will be forced into the slot 26 and the terminal edges of the adjacent section bodies 11 and the flanges thereof will be held in close contact, or form closed joints. When the meeting ends of the sections 5 and 6 are bowed outwardly, the combined spring keeper and cover, or protecting strip 27, will be correspondingly moved outwardly, the said strip exerting a resisting pressure on the catch member or extremity 20 of the tongue 18 and operates to prevent too loose association of the said tongue and the bars 23 and 24, and thereby holds the latter parts against separation, yet free to move during the time that the section ends are bowed outwardly and when the said ends are straightened with relation to each other, or disposed in normal interfitting positions. When it is desired to disconnect the tongue 18 from the bars 23 and 24, the combined keeper and cover or protecting strip 27 is manually drawn outwardly and held until the tongue 18 is disengaged from the said bars 23 and 24.

From the foregoing it will be seen that the improved hinge joint is structurally efficient as a means for holding the meeting ends of tire rim sections in positive assembled relation and that said meeting ends may be operated to have relative movements in removing and applying a tire to the complete rim. These hinge joints forming positive locks in cooperation with the lever organization 10, of whatever nature the latter may be, also provide for the formation of a tire rim that may be readily manipulated to expedite the application and removal of a tire without injury to the latter, or any liability of deteriorating or disadvantageously affecting the portion of the inner tube adjacent to the joints.

What is claimed as new is:

A collapsible tire rim composed of a number of sections having hinge joints between adjacent ends of the sections, the one section end having a projecting tongue of less thickness than the body portion of the section from which it projects and the adjacent section end correspondingly reduced in thickness relatively to the body portion of the section with which it forms a part, the latter adjacent section end being formed with cross bars defined by transverse slots and having different relative positions but both cross bars being located between the outer and inner surfaces of the section of which they form a part, the said tongue being applied under the one cross bar and over the other and having a terminal rib to engage in one of the slots to prevent longitudinal displacement of the tongue relatively to the cross bars, and a flat spring metal keeper and guard strip secured at one extremity to the outer side of the body member of the section having the tongue and extending over and unattached with relation to the adjacent section end having the cross bars to cover the joint formed by the engagement of the tongue and bars and also to exert a resilient pressure on a part of the tongue, the separation of the tongue from the cross bars being effected against the resistance of the said spring metal keeper and guard strip.

In testimony whereof I have hereunto set my hand.

JAQUELIN M. MEREDITH.